US012307702B2

(12) United States Patent
Pei et al.

(10) Patent No.: US 12,307,702 B2
(45) Date of Patent: May 20, 2025

(54) MAP PROCESSING METHOD AND APPARATUS

(71) Applicant: BEIJING BAIDU NETCOM SCIENCE TECHNOLOGY CO., LTD., Beijing (CN)

(72) Inventors: Xinxin Pei, Beijing (CN); Shuquan Zou, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 586 days.

(21) Appl. No.: 17/704,394

(22) Filed: Mar. 25, 2022

(65) Prior Publication Data

US 2022/0215574 A1 Jul. 7, 2022

(30) Foreign Application Priority Data

Jun. 24, 2021 (CN) .......................... 202110704829.X

(51) Int. Cl.
*G06T 3/4007* (2024.01)
*G06T 7/13* (2017.01)
*G06T 7/70* (2017.01)

(52) U.S. Cl.
CPC .............. *G06T 7/70* (2017.01); *G06T 3/4007* (2013.01); *G06T 7/13* (2017.01)

(58) Field of Classification Search
CPC ................................. G06T 3/4007; G06T 7/13
See application file for complete search history.

(56) References Cited

U.S. PATENT DOCUMENTS 11,592,830 B2\* 2/2023 Agarwal .............. G05D 1/0223
2017/0294036 A1 10/2017 Dorum
2018/0099667 A1\* 4/2018 Abe .................. B60W 30/0956
(Continued)

FOREIGN PATENT DOCUMENTS

CN        105667518 A      6/2016
CN        111737636 A     10/2020
(Continued)

OTHER PUBLICATIONS

Notice of Grant of Patent Rights for Chinese Application No. 202110704829.X mailed on Nov. 24, 2023, 7 pages.
(Continued)

*Primary Examiner* — Ian L Lemieux
*Assistant Examiner* — William Le
(74) *Attorney, Agent, or Firm* — Tucker Ellis LLP

(57) ABSTRACT

The present disclosure provides a map processing method and apparatus. The specific implementation scheme is: determining a road to be processed in a map, where the road has a first edge line and a second edge line; performing interpolation processing on M gauge points on the first edge line to obtain a first point set of T first sampling points on the first edge line and performing interpolation processing on N gauge points on the second edge line to obtain a second point set of T second sampling points on the second edge line; determining a corresponding relationship between the T first sampling points in the first point set and the T first sampling points in the second point set; and determining a center line of the road in the map according to M, N and the corresponding relationship.

20 Claims, 8 Drawing Sheets

(56) References Cited

U.S. PATENT DOCUMENTS

2018/0285659 A1* 10/2018 Kwant .................. G06V 10/48
2020/0172100 A1* 6/2020 Kato ........................ G08G 1/16
2020/0193176 A1* 6/2020 Tanaka .................. B60W 10/04

FOREIGN PATENT DOCUMENTS

| CN | 111811530 A | 10/2020 |
| CN | 112651983 A | 4/2021 |
| CN | 112785844 A | 5/2021 |
| CN | 112418193 B | 6/2021 |

OTHER PUBLICATIONS

Office Action from corresponding Application No. 202110704829.X mailed on Sep. 13, 2023, 7 pages.
Wu, Zhe, et al., "Lane Mark Identification Algorithm Based on Fast Line Detection", Computer Technology and Development, May 2009, vol. 19, No. 5, 5 pages.

* cited by examiner

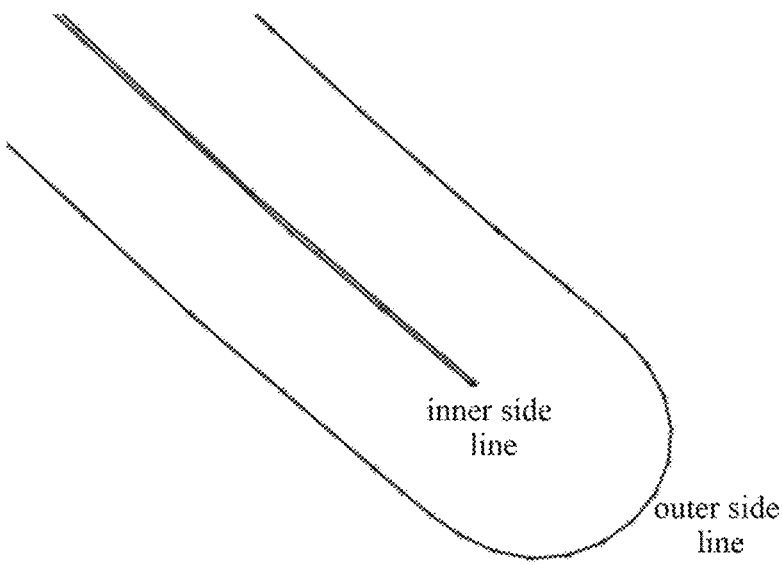

FIG. 3

```
┌─────────────────────────────────────────────────────────────┐
│   Determine a road to be processed in a map, where the road │
│   has a first edge line and a second edge line, there are M │ S401
│   gauge points on the first edge line, there are N gauge    │
│   points on the second edge line, and M and N are integers  │
│   greater than or equal to 2 respectively                   │
└─────────────────────────────────────────────────────────────┘
                              ↓
┌─────────────────────────────────────────────────────────────┐
│   Perform interpolation processing on the M gauge points on │
│   the first edge line to obtain a first point set of T first│
│   sampling points on the first edge line and perform        │ S402
│   interpolation processing on the N gauge points on the     │
│   second edge line to obtain a second point set of T second │
│   sampling points on the second edge line according to a    │
│   first length of the first edge line, a second length of   │
│   the second edge line and a preset point density           │
└─────────────────────────────────────────────────────────────┘
                              ↓
┌─────────────────────────────────────────────────────────────┐
│   Determine a corresponding relationship between the points │ S403
│   in the first point set and the points in the second       │
│   point set                                                 │
└─────────────────────────────────────────────────────────────┘
                              ↓
┌─────────────────────────────────────────────────────────────┐
│   Determine a center line of the road in the map according  │ S404
│   to M, N and the corresponding relationship                │
└─────────────────────────────────────────────────────────────┘
```

FIG. 4

MAP PROCESSING METHOD AND APPARATUS

CROSS-REFERENCE TO RELATED APPLICATIONS

The present disclosure is based on and claims priority of Chinese application for invention No. 202110704829.X, filed on Jun. 24, 2021, the disclosure of which is hereby incorporated into this disclosure by reference in its entirety.

TECHNICAL FIELD

The present disclosure relates to an automatic driving technology in the field of data processing, and, more particularly, to a map processing method and apparatus.

BACKGROUND

In the field of automatic driving, two sidelines of the road will be given in a high definition map, and it is usually necessary to determine the center line of the two sidelines.

At present, when determining the center line in the related art, the corresponding points are usually determined on the sidelines on both sides, and then the center point of the connecting line of the corresponding points on the sidelines on both sides are determined, and then after connecting the center points, the center line of the two sidelines may be determined. When the number of points on the sidelines on both sides is relatively close, such an implementation may achieve better results.

However, when the number of points on the sidelines on both sides is greatly different, the center point determined by the connecting line cannot accurately describe the center line, which will result in lower accuracy of the determined center line.

SUMMARY

The present disclosure provides a map processing method and apparatus.

According to a first aspect of the present disclosure, a map processing method is provided, including:
  determining a road to be processed in a map, where the road has a first edge line and a second edge line, there are M gauge points on the first edge line, there are N gauge points on the second edge line, and M and N are integers greater than or equal to 2 respectively;
  performing interpolation processing on the M gauge points on the first edge line to obtain a first point set of T first sampling points on the first edge line and performing interpolation processing on the N gauge points on the second edge line to obtain a second point set of T second sampling points on the second edge line according to a first length of the first edge line, a second length of the second edge line and a preset point density, where T is an integer greater than or equal to 2;
  determining a corresponding relationship between the points in the first point set and the points in the second point set; and
  determining a center line of the road in the map according to M, N and the corresponding relationship.

According to a second aspect of the present disclosure, a map processing apparatus is provided, including:
  a determining module, configured to determine a road to be processed in a map, where the road has a first edge line and a second edge line, there are M gauge points on the first edge line, there are N gauge points on the second edge line, and M and N are integers greater than or equal to 2 respectively;
  an interpolating module, configured to perform interpolation processing on the M gauge points on the first edge line to obtain a first point set of T first sampling points on the first edge line and perform interpolation processing on the N gauge points on the second edge line to obtain a second point set of T second sampling points on the second edge line according to a first length of the first edge line, a second length of the second edge line and a preset point density, where T is an integer greater than or equal to 2;
  the determining module is further configured to determine a corresponding relationship between the points in the first point set and the points in the second point set; and
  a processing module, configured to determine a center line of the road in the map according to M, N and the corresponding relationship.

According to a third aspect of the present disclosure, an electronic device is provided, including:
  at least one processor; and
  a memory, communicatively connected with the at least one processor; where
  the memory stores instructions executable by the at least one processor, and the instructions are executed by the at least one processor to enable the at least one processor to execute the method described in the first aspect.

According to a fourth aspect of the present disclosure, a non-transitory computer readable storage medium storing computer instructions is provided, where the computer instructions are used to cause a computer execute the method described in the first aspect.

According to a fifth aspect of the present disclosure, a computer program product is provided, including a computer program stored in a readable storage medium, at least one processor of an electronic device may read the computer program from the readable storage medium, and the at least one processor executes the computer program to cause the electronic device to execute the method described in the first aspect.

The technology according to the present disclosure improves the accuracy of determining the center line.

It will be understood that the content described in this section is not intended to identify key or important features of embodiments of the present disclosure, or to limit the scope of the present disclosure. Other features of the present disclosure will be easily understood through the following description.

BRIEF DESCRIPTION OF DRAWINGS

The accompanying drawings are provided to better understand the present solution, and not to limit the present disclosure.

FIG. 3 is an implementation diagram of an arc-segment road provided by an embodiment of the present disclosure;

FIG. 4 is a flowchart of a map processing method provided by an embodiment of the present disclosure;

DESCRIPTION OF EMBODIMENTS

The following describes exemplary embodiments of the present disclosure with reference to the accompanying drawings, which include various details of the embodiments of the present disclosure to assist in understanding, and should be regarded as merely exemplary. Accordingly, those of ordinary skill in the art should recognize that various changes and modifications of the embodiments described herein can be made without departing from the scope and spirit of the disclosure. Similarly, descriptions of well-known functions and structures is omitted for clarity and conciseness in the following description.

In order to better understand the technical solutions of the present disclosure, the related technologies involved in the present disclosure will be further introduced in detail below.

Generally speaking, there are many scenes that show a set of curves that are approximately parallel lines, and need to determine a center line with better effect.

In the scene of automatic driving, left and right sidelines of a road are usually showed in a high definition map, and a vehicle control unit usually desires that a travel track of a vehicle may keep in a center of a lane, so it is usually need to fit a center line with better effect according to a lane sidelines on both sides.

When determining the center line of two sidelines in the current related technology, there may be the following two possible implementations.

In a possible implementation, for example, corresponding points of two sidelines may be determined, after which center points of connecting lines of the corresponding points may be determined, and the center line may be obtained after connecting center points of the connecting lines.

Figure 1:
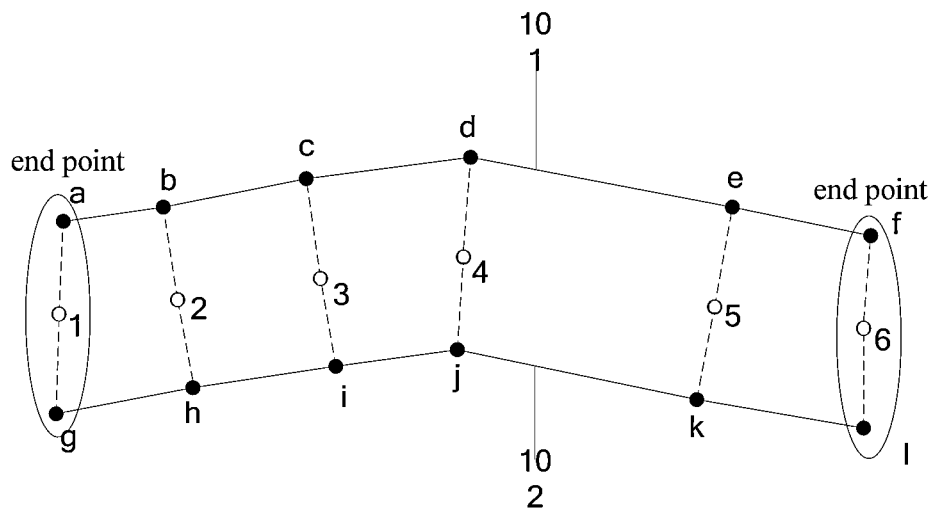
FIG. 1 is an implementation diagram of determining a center line according to center points of connecting lines provided by an embodiment of the present disclosure.

For example, it can be understood with reference to FIG. 1, which is an implementation diagram of determining a center line according to center points of connecting lines provided by an embodiment of the present disclosure.

As illustrated in FIG. 1, there are two sidelines in FIG. 1, a sideline 101 and a sideline 102 respectively, which are approximately parallel, and it is desirable to obtain a center line corresponding to the two sidelines.

With reference to FIG. 1, it may be determined that there includes a gauge point a, a gauge point b, a gauge point c, a gauge point d, a gauge point e, and a gauge point f on a sideline 101, where the gauge point a and the gauge point f are end points; and there includes a gauge point g, a gauge point h, a gauge point i, a gauge point j, a gauge point k, and a gauge point l on a sideline 102, where the gauge point g and the gauge point l are end points.

As illustrated in FIG. 1, the center point may be determined based on the connecting line of the gauge points on the two sidelines, for example, a center point 1 of the connecting line may be determined based on the gauge point a on the sideline 101 and the gauge point g on the sideline 102; a center point 2 of the connecting line may be determined based on the gauge point b on the sideline 101 and the gauge point h on the sideline 102; a center point 3 of the connecting line may be determined based on the gauge point c on the sideline 101 and the gauge point i on the sideline 102; a center point 4 of the connecting line may be determined based on the gauge point d on the sideline 101 and the gauge point j on the sideline 102; a center point 5 of the connecting line may be determined based on the gauge point e on the sideline 101 and the gauge point k on the sideline 102; a center point 6 of the connecting line may be determined based on the gauge point f on the sideline 101 and the gauge point l on the sideline 102.

After determining the center point of each connecting line, a connecting line of the center points of the connecting lines may be determined as the center line.

In another possible implementation, because in actual production, when sampling the gauge points of the two sidelines, the density of the gauge points are different, which will cause the number of sampling points of the two sidelines to be inconsistent, or the number of sampling points is the same but an interval is large. In this case, if a middle point of the connecting line is directly taken, it will cause a large deformation in the obtained center line. Therefore, in this case, a perpendicular may be drawn from a point on one side of a sideline to another side and the center line is obtained by middle points of the perpendiculars.

Figure 2:
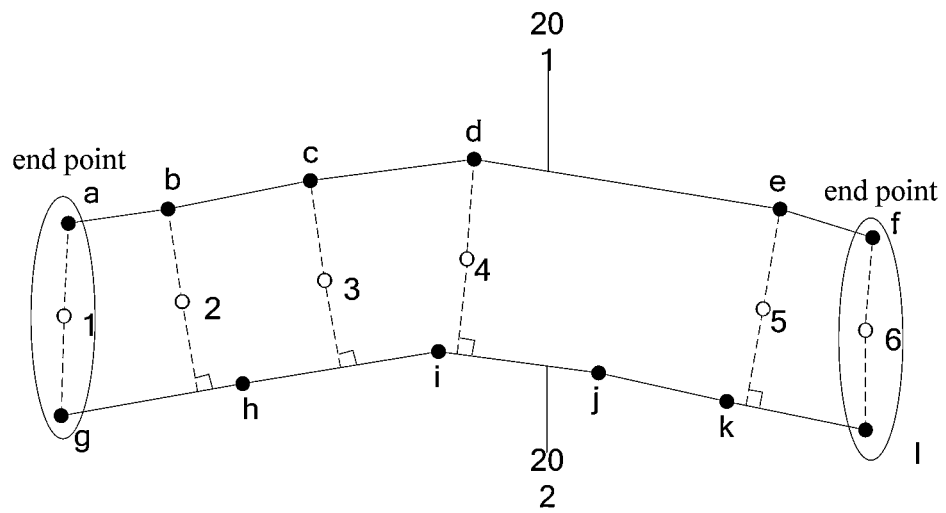
FIG. 2 is an implementation diagram of determining a center line according to center points of perpendiculars provided by an embodiment of the present disclosure.

For example, it can be understood with reference to FIG. 2, which is an implementation diagram of determining a center line according to center points of perpendiculars provided by an embodiment of the present disclosure.

As illustrated in FIG. 2, there are two sidelines in FIG. 2, a sideline 201 and a sideline 202 respectively, which are approximately parallel, and but the degrees of density of the gauge points on the two lane sidelines are different.

With reference to FIG. 2, it may be determined that there includes a gauge point a, a gauge point b, a gauge point c, a gauge point d, a gauge point e, and a gauge point f on a sideline 201, where the gauge point a and the gauge point f are end points; and there includes a gauge point g, a gauge point h, a gauge point i, a gauge point j, a gauge point k, and a gauge point 1 on a sideline 202, where the gauge point g and the gauge point 1 are endpoints.

As illustrated in FIG. 2, a perpendicular may be drawn from a point on one side of a sideline to another side and a center point of the perpendicular is determined. For example, a perpendicular may be drawn from the gauge point a on the sideline 201 to the sideline 202, and then a center point 1 of the perpendicular is determined; a perpendicular may be drawn from the gauge point b on the sideline 201 to the sideline 202, and determining a center point 2 of the perpendicular is determined; a perpendicular may be drawn from the gauge point c on the sideline 201 to the sideline 202, and then a center point 3 of the perpendicular is determined; a perpendicular may be drawn from the gauge point d on the sideline 201 to the sideline 202, and then a center point 4 of the perpendicular is determined; a perpendicular may be drawn from the gauge point e on the sideline 201 to the sideline 202, and then a center point 5 of the perpendicular is determined; a perpendicular may be drawn from the gauge point f on the sideline 201 to the sideline 202, and then a center point 6 of the perpendicular is determined.

After determining the center point of each perpendicular, a connecting line of the center points of the perpendiculars may be determined as a center line.

Whether the center line is determined according to the center points of the connecting lines introduced above or determining according to the center points of the perpendiculars, its performance on a straighter road is basically normal, but on an arc segment, especially when the difference between the numbers of points on the two sides is too large, it is difficult to ensure a correctness of the determined center line.

For example, it can be understood with reference to FIG. 3, which is an implementation diagram of an arc-segment road provided by an embodiment of the present disclosure.

Referring to FIG. 3, which illustrates an arc-segment road, the sidelines on both sides of the road are an inner side line and an outer side line respectively, where the inner side line has only 2 points at the arc segment, and the number of points on the outer side line is much larger than that on the inner side line.

In such case, if a perpendicular is drawn from a point on the inner side line to the outer side line, only two perpendiculars may be obtained, then only two middle points of the perpendiculars can be determined, therefore, the middle points of the perpendiculars obtained in this case cannot accurately describe the center line.

Based on this, the present disclosure proposes the following technical concept: in order to solve the problem of low accuracy of the center line caused by the large difference in the number of gauge points on the sidelines on both sides, point interpolation processing may be performed on the sidelines on both sides, after which, the numbers of points on both side lines may be equal, and then the corresponding center points may be determined, and because the number of the center points determined after interpolation processing is large, further thinning processing may be performed, and then the center line is determined according to the center points after the thinning processing, which can effectively ensure the accuracy of the determined center line.

The map processing method provided by the present disclosure will be introduced below with reference to specific embodiments. The execution body of the embodiments of the present disclosure may be a device with a data processing function, for example, a server, a processor, which is not limited in this embodiment. The specific implementation of the execution body may be selected according to actual demands.

Figure 5:
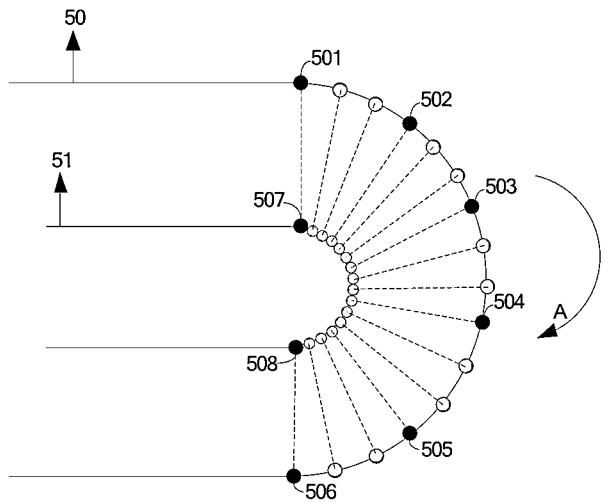
FIG. 5 is an implementation diagram of determining a corresponding relationship provided by an embodiment of the present disclosure.

Firstly, the map processing method provided by the embodiments of the present disclosure is introduced with reference to FIG. 4 and FIG. 5, FIG. 4 is a flowchart of a map processing method provided by an embodiment of the present disclosure; and FIG. 5 is an implementation diagram of determining a corresponding relationship provided by an embodiment of the present disclosure.

As illustrated in FIG. 4, the method includes:

S401: determine a road to be processed in a map, where the road has a first edge line and a second edge line, there are M gauge points on the first edge line, there are N gauge points on the second edge line, and M and N are integers greater than or equal to 2 respectively.

It may be understand that a plurality of roads may be included in a map, the road to be processed may be determined in the map in the embodiment, where the road to be processed is a road whose center line needs to be determined. The embodiment does not limit the specific implementation of the road to be processed, it can be of any shape and can be located at any position, any road whose center line needs to be determined can be taken as the road to be processed in the embodiment.

Two edge lines can indicate a road, and therefore, the road in this embodiment has a first edge line and a second edge line, and each edge line may include gauge points, where the gauge points can be understood as collection points during map information collection.

In a possible implementation, there are M gauge points on the first edge line, where M is an integer greater than or equal to 2, and there are N gauge points on the second edge line, where N is an integer greater than or equal to 2.

In an actual implementation process, the specific values of M and N depend on the number of sampling points specifically included in the edge lines on both sides of the road currently determined to be processed, and the specific values of M and N are not particularly limited in this embodiment.

It should be noted here that the road to be processed in this embodiment may be a road with a full width, so the first edge line and the second edge line may be road lines on outer side of the road; or the road to be processed may also be only a road composed of two lane lines, so the first edge line and the second edge line may also be lane lines, which depend on the position of the center line currently to be determined and are not particularly limited in this embodiment.

S402: perform interpolation processing on the M gauge points on the first edge line to obtain a first point set of T first sampling points on the first edge line and perform interpolation processing on the N gauge points on the second edge line to obtain a second point set of T second sampling points on the second edge line according to a first length of the first edge line, a second length of the second edge line and a preset point density, where T is an integer greater than or equal to 2.

In this embodiment, in order to avoid the problem of low accuracy of the determined center line caused by the large difference in the number of gauge points on the edge lines on both sides, interpolation processing may be performed on the first edge line and the second edge line, thereby reducing the difference between the numbers of points on the edge lines on both sides.

In a possible implementation, interpolation processing may be performed according to the first length of the first edge line, the second length of the second edge line and the preset point density to determine the T first sampling points on the first edge line and the T second sampling points on the second edge line, where the first sampling points are points of the first edge line after interpolation processing, and the second sampling points are points of the second edge line after interpolation processing, the T first sampling points may form the first point set, and the T second sampling points may form the second point set.

In a possible implementation, original gauge points may be kept during the interpolation processing, therefore, for example, K interpolation points may be added into the first edge line, the total number T of the first sampling points on the first edge line after interpolation processing is a sum of M and K; and L interpolation points may be added into the second edge line, the total number T of the second sampling points on the second edge line after interpolation processing is a sum of N and L.

In another possible implementation, the original gauge points may not be kept deliberately during the interpolation processing, in this case, the T sampling points after interpolation processing may only include a partial of the gauge points.

In actual implementation process, a specific implementation of the T sampling points after interpolation processing may be selected according to actual demands, which may include all the gauge points or a partial of the gauge points, which is specifically depending on the actual interpolation processing algorithm, and is not limited in this embodiment, as long as it is ensured that the number of the first sampling points on the first edge line after interpolation processing is equal to the number of the second sampling points on the second edge line, and both are T.

It may be understood that, in order to ensure the accuracy of the determined center line, this embodiment sets that the total numbers of sampling points on the edge lines on both sides after interpolation processing are equal.

In this embodiment, the preset point density is used to indicate a point density after interpolation processing, which may also be understood as a interpolation density. For example, the preset point density may be 0.5 m (meters), which specifically indicate that there is a point every 0.5 m. The smaller the preset point density is set, the more the number of points after interpolation processing, and correspondingly, the larger the preset point density is set, the less the number of points after interpolation processing, and the specific implementation of the preset point density may be selected according to actual demands.

For example, the current interpolation processing may be understood with reference to FIG. 5, as illustrated in FIG. 5, there are currently two edge lines, a first edge line 50 and a second edge line 51 respectively. It is assumed that the first edge line 50 includes 6 gauge points, 501, 502, 503, 504, 505, and 506 respectively, and there are two gauge points on the second edge line 51, 507 and 508 respectively, if the center line is determined directly based on center points of connecting lines or center points of perpendiculars, the determined center line may be inaccurate.

Figure 7:
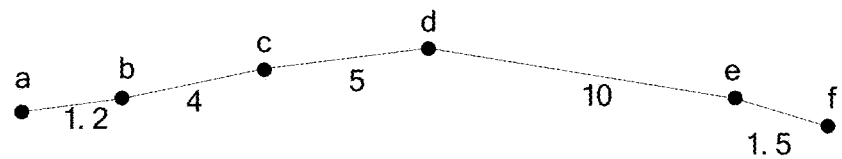
FIG. 7 is a diagram of determining a distance between adjacent gauge points provided by an embodiment of the present disclosure.

Therefore, interpolation processing is performed in this embodiment. In a possible implementation, as illustrated in FIG. 7, after interpolation processing, there are 16 sampling points on each of the first edge line 50 and the second edge line 51, and in other words, it is necessary to ensure that the number of the first sampling points of the first edge line after interpolation processing is equal to the number of the second sampling points of the second edge line after interpolation processing.

S403: determine a corresponding relationship between the points in the first point set and the points in the second point set.

After the interpolation processing is completed, the number of points on the first edge line and the number of points on the second edge line are equal. For example, the points on the first edge line may constitute the first point set, and the first point set may include the T first sampling points on the first edge line; and, the points on the second edge line may constitute the second point set, and the second point set may include the T second sampling points on the second edge line.

After that, the corresponding relationship between each point in the first point set and each point in the second point set may be determined. In a possible implementation, because the number of points in the first point set is equal to the number of points in the second point set, the corresponding relationship between each point on the first edge line and each point on the second edge line may be determined in sequence according to a preset direction, so that an one-to-one corresponding relationship between the points on the first edge line and the points on the second edge line may be determined.

For example, the current implementation of determining the corresponding relationship may be understood with reference to FIG. 5. As illustrated in FIG. 5, after interpolation processing, the first edge line 50 includes 16 first points, which may constitute the first point set, and the second edge line 51 includes 16 second points, which may constitute the second point set.

Because the number of points in the first point set is equal to the number of points in the second point set, the one-to-one corresponding relationship between each points may be determined, for example, the corresponding relationship between each point on the first point set and each point on the second point set may be determined in sequence according to a direction indicated by an arrow A illustrated in FIG. 5, so as to obtain an one-to-one corresponding relationship between the 16 points on the first edge line and the 16 points on the second edge line.

It is worth noting that the implementation of determining the corresponding relationship introduced in FIG. 5 is only an exemplary introduction, in actual implementation process, the shapes of the first edge line and the second edge line, and the number of points in the first point set and the second point set, etc. may be selected according to actual demands, which is not limited in this embodiment.

S404: determine a center line of the road in the map according to M, N and the corresponding relationship.

After determining the corresponding relationship introduced above, a lot of connecting lines may be determined actually, and then a lot of connecting points may be determined. However, because the number of points after interpolation processing is generally very large in the process of interpolation processing to ensure the uniformity of the point distribution. In order to facilitate subsequent processing and save system resources, a thinning processing may be further performed on the determined center points according to M, N and the corresponding relationship to reduce the number of the center points.

The thinning processing is to delete a certain number of center points, and the specific implementation of the thinning processing may be selected according to actual demands, which is not limited in this embodiment, as long as the number of center points may be reduced.

In a possible implementation, a connecting line of the center points after thinning processing may be determined as the center line; alternatively, a curve fitted by the center points after thinning processing may also be determined as the center line, so as to realize the determination of the center line of the road in the map.

The map processing method provided by the embodiment of the present disclosure, including: determining a road to be processed in a map, wherein the road has a first edge line and a second edge line, there are M gauge points on the first edge line, there are N gauge points on the second edge line, and M and N are integers greater than or equal to 2 respectively; performing interpolation processing on the M gauge points on the first edge line to obtain a first point set of T first sampling points on the first edge line and performing interpolation processing on the N gauge points on the second edge line to obtain a second point set of T second sampling points on the second edge line according to a first length of the first edge line, a second length of the second edge line and a preset point density, wherein T is an integer greater than or equal to 2; determining a corresponding relationship between the points in the first point set and the points in the second point set; and determining a center line of the road in the map according to M, N and the corresponding relationship. Interpolation processing on the edge lines on both sides is performed to ensure that the numbers of points on the edge lines on both sides after interpolation processing are equal, and then a corresponding relationship between the points on the edge lines on both sides is determined, and the center line is determined according to the corresponding relationship, which may effectively avoid the problem of the poor accuracy of the center line caused by the large difference in the number of gauge points on the edge lines on both sides and effectively improve the accuracy of the determined center line.

Figure 8:
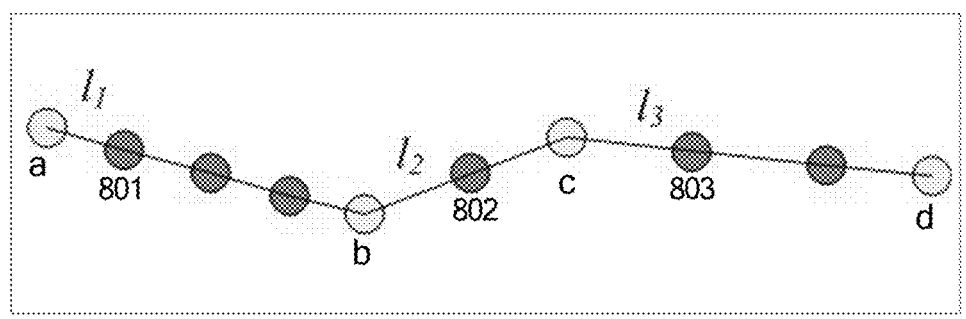
FIG. 8 is an implementation diagram of interpolation processing provided by an embodiment of the present disclosure.
Figure 9:
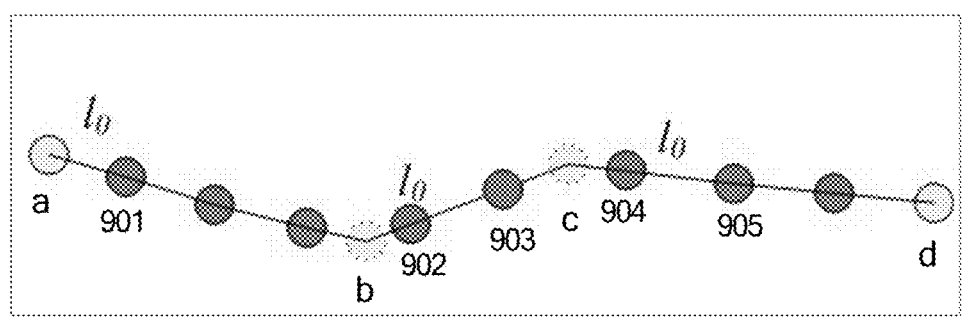
FIG. 9 is another implementation diagram of interpolation processing provided by an embodiment of the present disclosure.

On the basis of the embodiments mentioned above, the specific implementation of the interpolation processing is firstly introduced in the following with reference to FIGS. 6 to 9, FIG. 6 is a second flowchart of a map processing method provided by an embodiment of the disclosure, FIG. 7 is a diagram of determining a distance between adjacent gauge points provided by an embodiment of the present disclosure, FIG. 8 is an implementation diagram of interpolation processing provided by an embodiment of the present disclosure, and FIG. 9 is another implementation diagram of interpolation processing provided by an embodiment of the present disclosure.

Figure 6:
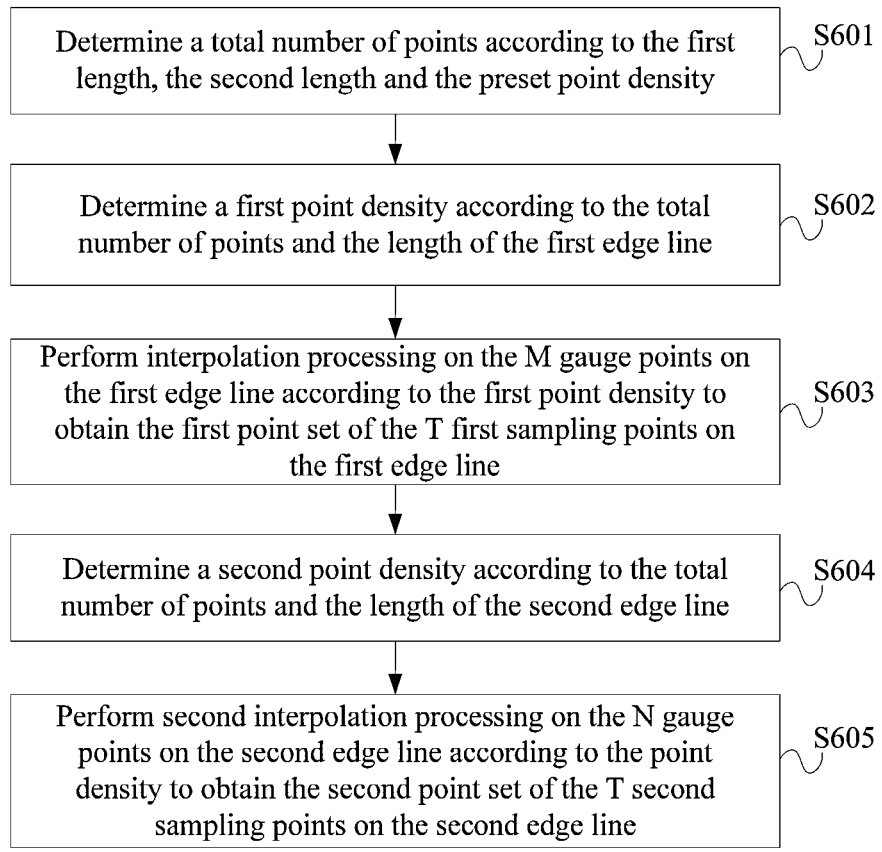
FIG. 6 is a second flowchart of a map processing method provided by an embodiment of the disclosure.

As illustrated in FIG. 6, the method includes:

S601: determine a total number of points according to the first length, the second length and the preset point density.

In the embodiment, it is necessary to ensure that the numbers of the points of the two edge lines are equal to each other during interpolation processing, for example the total number of points may be determined firstly according to the first length, the second length and the preset point density.

In a possible implementation, the total number of points may be determined according to a longer edge line, because the point density is preset, and the total number of points determined according to the longer edge line and the preset point density may be larger, so that the distribution of the determined points may be ensured to be as uniform and dense as possible.

Therefore, according to the first length and the second length, it may be determined whether to determine the total number of points according to the first edge line or the second edge line.

In a possible implementation, if the first length is greater than or equal to the second length, it means that the first edge line is longer, and then the number of interpolation points between every two neighboring gauge points in the first edge line may be determined according to the preset point density, and a sum of the number of interpolation points between every two neighboring gauge points in the first edge line and M is determined as the total number of points.

In another possible implementation, if the first length is less than the second length, it means that the second edge line is longer, and then the number of interpolation points between every two neighboring gauge points in the second edge line may be determined according to the preset point density, and a sum of the number of interpolation points between every two neighboring gauge points in the second edge line and N is determined as the total number of points.

It can be determined that no matter the processing is performed according to which edge line, the implementation of determining the total number of points is the same, and therefore the implementation of determining the total number of points is introduced below by take any edge lines as an example.

The preset point density may indicate how far apart a present of a point is required, for example, if the preset point density is 0.5 m, then a present of a sampling point is required at an interval of 0.5 m, so, when determining the total number of points, for example, the number of interpolation points between every two neighboring gauge points may be determined according to the preset point density, and a sum of the number of interpolation points between every two neighboring gauge points is the total number of points that need to be interpolated, and then the total number of points may be determined according to the sum of the number of interpolation points and the sum of the number of original gauge points.

The implementation of determining the number of interpolation points between every two neighboring gauge points according to the preset point density may be, for example, dividing a distance between every two neighboring gauge points by the preset point density, and then rounding up the obtained value and subtracting 1, the final value is the number of interpolation points.

For example, the above process can be understood with reference to FIG. 7. Referring to FIG. 7, it is assumed that FIG. 7 currently shows is an edge line on one side with longer length, which includes a gauge point a, a gauge point b, a gauge point c, a gauge point d, a gauge point e, and a gauge point f.

A distance between the gauge point a and the gauge point b is 1.2 m, a value 2 is obtained by dividing the distance by the preset point density 0.5 m and then rounding it off, where 2 actually represents the number of line segments, so that the number of interpolation points between the gauge point a and the gauge point b, which is 1, may be obtained by subtracting 1 from the value 2 obtained by rounding.

A distance between the gauge point b and the gauge point c is 4 m, a value 8 is obtained by dividing the distance by the preset point density 0.5 m and then rounding it off, where 8 also represents the number of line segments, so that the number of interpolation points between the gauge point b and the gauge point c, which is 7, may be obtained by subtracting 1 from the value 8 obtained by rounding.

The implementation of determining the number of interpolation points between the remaining neighboring gauge points is similar, which will not be repeated here. After the number of interpolation points between each neighboring gauge point is determined, a sum of the total number of interpolation points between neighboring gauge points and the original gauge points may be determined, thereby determining the total number of points.

The distance between neighboring gauge points and the number of determined interpolation points between each neighboring gauge point introduced above with reference to FIG. 7 is exemplary introduction. In actual implementation process, it may all be selected according to actual demands. In a possible example, for example, the number of gauge points in the edge line with longer length is 10, and the total number of points determined later may be, for example, 150.

S602: determine a first point density according to the total number of points and the length of the first edge line.

After determining the total number of points, the specific interpolation processing may be performed based on the total number of points, where the total number of points may indicate the number of points that supposed to be included on the edge line after interpolation processing. For example, if the total number of points is 150, whether it is the first edge line or the second edge line, the total number of points are supposed to be 150 after interpolation processing.

At the same time, it should be noted that, in an implementation process of determining the total number of points, a rounding processing is performed, which ensures the uniformity of the interpolation processing, and the point density can be further determined according to the total number of points and the length of the edge line.

It may be understood that, for the edge line used to determine the total number of points, the determined first point density is very close to the preset point density, and the uniformity and accuracy of interpolation may be further ensured according to the first point density.

Interpolation processing is required to be performed on both the first edge line and the second edge line, here, the processing of the first edge line will be introduced first.

A first point density may be determined according to the total number of points and the length of the first edge line. In a possible implementation, the length of the first edge line may be divided by the total number of points to obtain the first point density, which can be expressed as the following Formula 1:

$$\text{Inter}_{density1} = \frac{length1}{\text{Interp\_num}} \quad \text{Formula 1}$$

where, length1 is the first length of the first edge line, Interp_num is the total number of points, and Interp_density1 is the first point density.

In the actual implementation process, in addition to determining the first point density according to the implementation indicated by the above Formula 1, the total number of points may be determined according to, for example, a preset algorithm, a preset model, etc., which is not limited in this embodiment, as long as the total number of points is determined according to the length of the first edge line and the total number of points.

S603: perform interpolation processing on the M gauge points on the first edge line according to the first point density to obtain the first point set of the T first sampling points on the first edge line.

After the first point density is determined, the interpolation processing may be performed on the first edge line according to the first point density. In the embodiment, the first edge line includes M gauge points before the interpolation processing, and the first edge line includes the first point set of T first sampling points after the interpolation processing, the first point set constituted by the T first sampling points may include all M gauge points, or may also include only part of the M gauge points, which depends on the specific interpolation processing method, where the interpolation processing method may be, for example, linear interpolation, polynomial interpolation, spline interpolation, etc., this embodiment does not particularly limit the specific implementation of the interpolation processing method, which can be selected and extended according to actual demands.

Two different implementations for obtaining the T first sampling points by interpolation will be described respectively below.

In a possible implementation, the original gauge points may be kept during the interpolation process, that is to say, the first point set constituted by the T first sampling points includes M gauge points, then, for example, a position of an interpolation point between every two neighboring gauge points in the first edge line may be determined according to the first point density to obtain positions of K interpolation points; and the K interpolation points are added into the first edge line according to the positions of the K interpolation points, wherein the first point set comprises the K interpolation points and the M gauge points, and a sum of K and M is equal to T.

That is to say, in this implementation, the interpolation position is determined between every two neighboring gauge points, so as to ensure that the original M gauge points are kept, for example, the current implementation may be understood with reference to FIG. 7.

As illustrated in FIG. 8, the line therein is, for example, the first edge line, it is assumed that at least 4 gauge points are currently included on the first edge line, gauge point a, gauge point b, gauge point c, and gauge point d respectively.

The first point density is currently determined, then the number of interpolation points between every two neighboring gauge points may be determined according to the first point density, where the implementation of determining the number of interpolation points between neighboring gauge points according to the point density is similar to that introduced above, afterwards, for example, the distance between neighboring gauge points may be divided into equal parts according to the number of interpolation points between neighboring gauge points, so as to determine the position of the interpolation point between every two neighboring gauge points.

For example, the currently determined first point density is 0.5 m, and the length between the gauge point a and the gauge point b may be, for example, 2.1 m, then, for example 2.1 may be divided by 0.5 and then round up, and the value after rounding is 4, which subtracts 1 to obtain the number of interpolation points between the gauge point a and the gauge point b, that is, 3 interpolation points. Then, for example, the length between the gauge point a and the gauge point b may be divided into four equal parts, so as to determine the position of the 3 interpolation points.

For the implementation of determining the position of the interpolation point between every two neighboring gauge points is similar, the position of the interpolation point is determined between every two neighboring gauge points, and a total of K positions of interpolation points may be determined. For example, in FIG. 8, there are 3 positions of the interpolation points between the gauge point a and the gauge point b, there is 1 position of the interpolation point between the gauge point b and the gauge point c, and there are 2 positions of the interpolation points between the gauge point c and the gauge point d, so that there are 6 positions of the interpolation point that may be determined in total, then an interpolation is performed at the corresponding position to obtain 10 first sampling points illustrated in FIG. 8, and the 10 first sampling points include 6 interpolation points and 4 gauge points.

It may be understood that because the distance between each gauge point cannot be ensured to be exactly an integer multiple of the first point density, the actual point density after interpolation processing is close to the first point density in the implementation of keeping the gauge points, but which cannot be ensured to be exactly the same.

For example, the first point density is 0.5 m, so that the distance1_1 between the point a and the point 801, the distance1_2 between the point b and the point 802, and the distance1_3 between the point c and the point 803 in FIG. 8 are all close to 0.5, but which cannot be ensured to be 0.5.

The above introduction is the implementation of keeping gauge points in the interpolation process, in another possible implementation, it is also possible to interpolate strictly according to the point density without keeping the gauge points during the interpolation processing. For example, according to the first point density and the shape of the first edge line, the first point set composed of the T first sampling points on the first edge line may be determined, and the first point set includes part of the gauge points on the first edge line.

For example, it can be understood with reference to FIG. 9. As illustrated in FIG. 9, the line therein is, for example, the first edge line, it is assumed that at least 4 gauge points are currently included on the first edge line, gauge point a, gauge point b, gauge point c, and gauge point d respectively.

The first point density is currently determined, then the T first sampling points on the first edge line may be determined strictly according to the first point density. In the process of determining the first point, because it is necessary to ensure that the determined sampling point is located on the first edge line and is uniformly determined, it needs to be determined according to the shape of the first edge line.

For example, if the currently determined first point density is 0.5 m, starting from the marked point a, a position 901 on the first edge line at a distance of 0.5 m from the gauge point a is determined, which is determined as an position of the interpolation point, and then a position on the first edge line at a distance of 0.5 m from the position 901 is determined, and so on, until the end of the first edge line is reached, so that T first sampling points may be determined.

It may be determined by referring to FIG. 9 that when performing interpolation according to this implementation, 10 first sampling points are also determined, but the gauge point b and the gauge point c will not be kept, which is to say that the gauge point b and the gauge point c are not included among the 10 first sampling points finally determined, and therefore, T first sampling points determined by interpolating in this implementation include part of the gauge points on the first edge line.

It may be understood that in this implementation, the interpolation is performed strictly according to the first point density, so that it may ensure that the actual point density after interpolation processing is equal to the first point density.

For example, the first point density is 0.5 m, so that the distance between the point a and the point 901, the distance between the point 902 and the point 903, and the distance between the point 904 and the point 905 in FIG. 9 are all 1_0, which are all equal to 0.5.

In the actual implementation, the specific implementation of interpolation processing may be selected according to actual demands, which is not limited in this embodiment.

S604: determine a second point density according to the total number of points and the length of the second edge line.

S605: determine a center line of the road in the map according to M, N and the corresponding relationship.

The above introduces the implementation of performing interpolation processing on the first edge line, S604 and S605 introduce the implementation of performing interpolation processing on the second edge line, the implementations are similar, similarly, and the interpolation processing may be implemented in two manners.

In a possible implementation, for example, a position of an interpolation point between every two neighboring gauge points in the second edge line may be determined according to the second point density to obtain positions of L interpolation points.

The L interpolation points are added into the second edge line according to the positions of the L interpolation points, wherein the second point set comprises the L interpolation points and the N gauge points, and a sum of L and N is equal to T.

In another possible implementation, the second point set of the T second sampling points on the second edge line may be determined according to the second point density and a shape the edge line, wherein the second point set comprises part of the gauge points on the second edge line.

The specific implementation is similar to the implementation of performing interpolation processing on the first edge line introduced in S602 and S603 above, and will not be repeated here.

The map processing method provided by the embodiment of the present disclosure, includes: determining a total number of points according to the first length, the second length and the preset point density; determining a first point density according to the total number of points and the length of the first edge line; performing interpolation processing on the M gauge points on the first edge line according to the first point density to obtain the first point set of the T first sampling points on the first edge line; determining a second point density according to the total number of points and the length of the second edge line; and performing second interpolation processing on the N gauge points on the second edge line according to the point density to obtain the second point set of the T second sampling points on the second edge line. By determining the total number of points according to the longer edge line between the first edge line and the second edge line and the preset point density, the uniformity and density of the interpolation may be effectively ensured, so as to effectively ensure the effect of subsequently determining the center line. Meanwhile, in the process of interpolation processing in this embodiment, the first point density and the second point density may be further determined according to the total number of points and the length of the edge line, after which the interpolation is performed according to the determined point density, which may effectively ensure that the number of corresponding sampling points of the first edge line and the second edge line after interpolation processing are equal to the total number of points, ensure the accuracy and stability of the interpolation processing, thereby avoiding the problem of poor stability of the center line caused by the large difference in the number of points on the edge lines on both sides. In the process of interpolation processing, all the gauge points may be kept, or the gauge points may not be kept specifically, so that the flexibility of the interpolation processing may be effectively improved.

On the basis of the above embodiments, in the process of interpolation processing, in order to ensure the uniformity of the determined points and the accurate correspondence of the positions, the density of the interpolation is often relatively large in the map processing method provided by the embodiments of the present disclosure, and the number of center points determined in this case is relatively large. In order to avoid the center points from being too dense, further thinning processing is needed after interpolation processing. The thinning process in the present disclosure may have a variety of different implementations, and two possible implementations are introduced respectively below.

Figure 10:
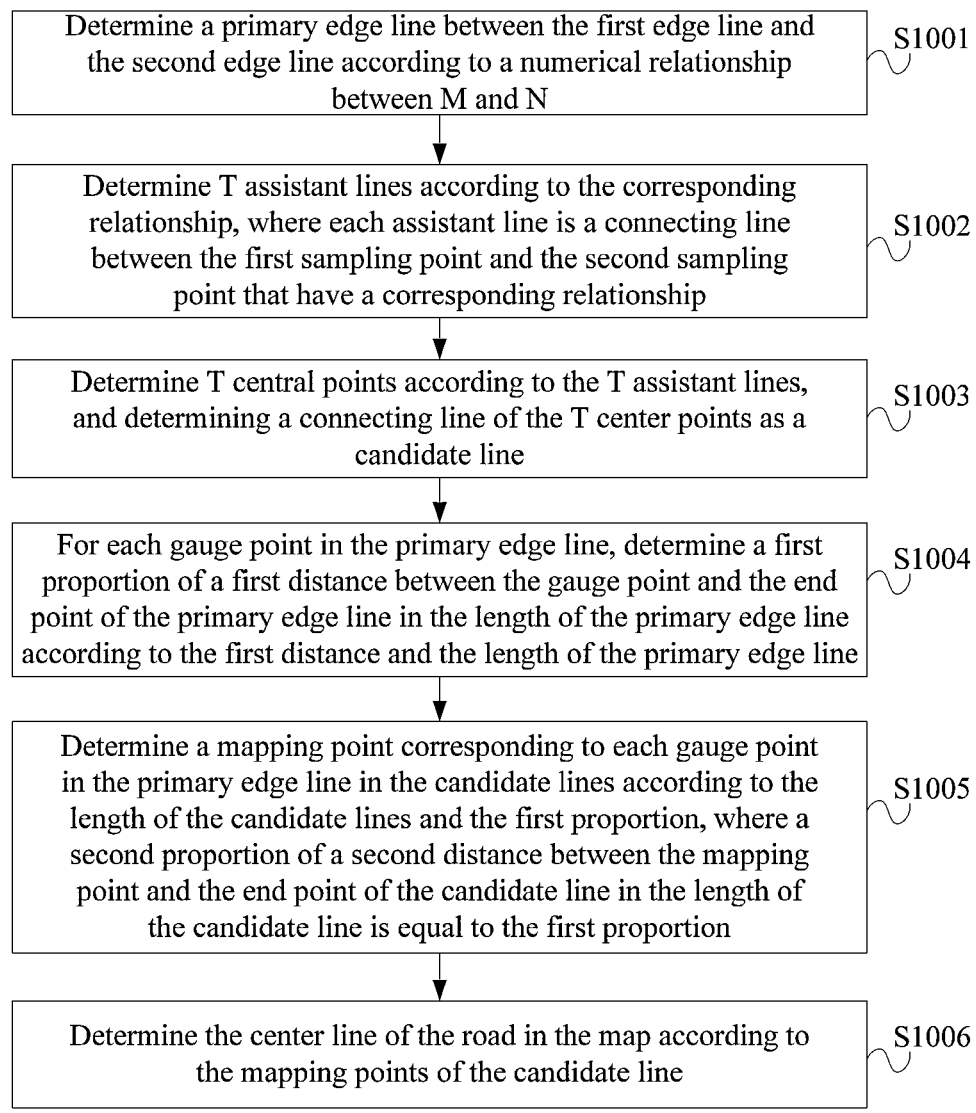
FIG. 10 is a third flowchart of a map processing method provided by an embodiment of the disclosure.
Figure 11:
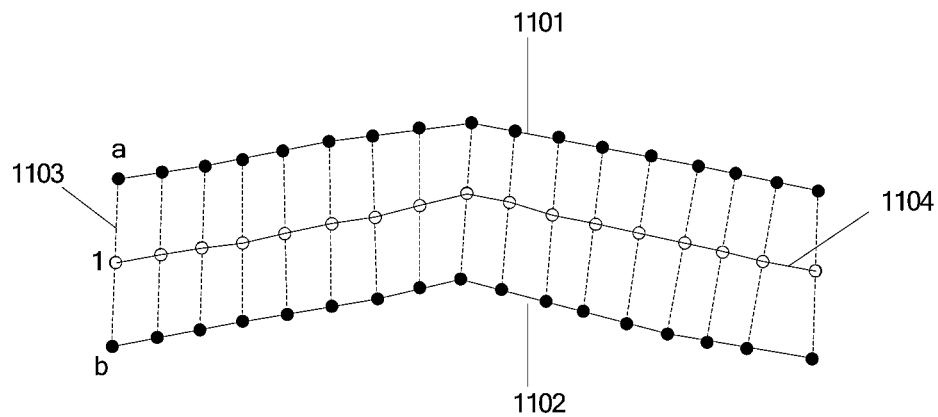
FIG. 11 is an implementation diagram of an assistant line provided by an embodiment of the present disclosure.
Figure 12:
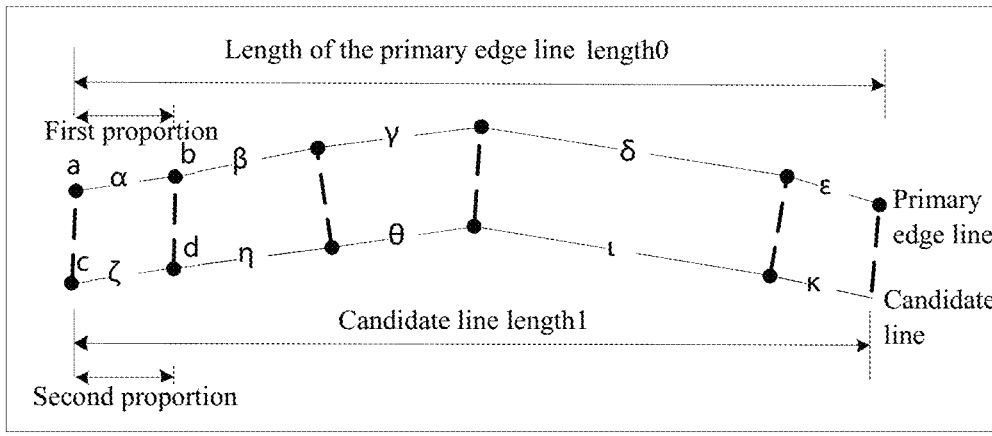
FIG. 12 is an implementation diagram of determining a mapping point corresponding to a gauge point of the primary edge line provided by an embodiment of the present disclosure.

Firstly, a possible implementation is introduced with reference to FIGS. 10 to 12, FIG. 10 is a third flowchart of a map processing method provided by an embodiment of the disclosure, FIG. 11 is an implementation diagram of an assistant line provided by an embodiment of the present disclosure, and FIG. 12 is an implementation diagram of determining a mapping point corresponding to a gauge point of the primary edge line provided by an embodiment of the present disclosure.

As illustrated in FIG. 10, the method includes:

S1001: determine a primary edge line between the first edge line and the second edge line according to a numerical relationship between M and N.

The purpose of the thinning processing in this embodiment is to reduce the number of center points. In a possible implementation, for example, the thinning process may be performed according to the position of the original gauge points on the edge line, which can effectively reduce the positions of the center points, and ensure that the determined center points correspond to the original gauge points.

Based on the above introduction, it may be determined that M gauge points are included on the first edge line, and N gauge points are included on the second edge line. In the thinning processing, although the number of center points should be reduced, the number of center points cannot be reduced too much. For example, there are 2 gauge points on an edge line, and there are 10 gauge points on the other edge line, so it is necessary to perform thinning processing based on the edge line including 10 gauge points to ensure the effect of the determined center line, that is to say that it is necessary to perform thinning processing based on the edge line with a larger number of gauge points in this embodiment.

Therefore, the primary edge line may be determined from the first edge line and the second edge line according to the numerical relationship between M and N in this embodiment, where the primary edge line is the edge line for thinning processing.

In a possible implementation, if M is greater than or equal to N, the first edge line is determined as the primary edge line.

Or, if M is less than N, the second edge line is determined as the primary edge line.

That is to say, the edge line that includes a larger number of gauge points is determined as the primary edge line.

S1002: determine T assistant lines according to the corresponding relationship, where each assistant line is a connecting line between the first sampling point and the second sampling point that have a corresponding relationship.

In the embodiments, after interpolation processing, the first edge line includes T first sampling points, the second edge line includes T second sampling points, and the corresponding relationship between the T first sampling points and the T second sampling points is determined, which has been introduced in the above embodiments, and will not be repeated here.

Based on the above introduction, it may be determined that the above determined corresponding relationship may be an one-to-one corresponding relationship between the T first sampling points and the T second sampling points, and then T assistant lines may be determined according to the corresponding relationship, where each assistant line is a connecting line between the first sampling point and the second sampling point that have a corresponding relationship.

For example, the assistant line introduced here may be understood with reference to FIG. 11. As illustrated in FIG. 11, there are currently a first edge line 1101 and a second edge line 1102, and FIG. 11 illustrates a situation after interpolation processing, and therefore, for example, the first edge line 1101 may include 17 first sampling points illustrated in FIG. 11, and the second edge line 1102 may include 17 second sampling points illustrated in FIG. 11, where there is an one-to-one corresponding relationship between the 17 first sampling points and the 17 second sampling points.

Then the first sampling point and the second sampling point that have a corresponding relationship are connected in sequence, namely, 17 assistant lines may be obtained, for example, 1103 in FIG. 11 indicates a connecting line between the first sampling point a and the second sampling point b, thereby the assistant line 1103 may be obtained.

S1003: determine T central points according to the T assistant lines, and determining a connecting line of the T center points as a candidate line.

After determining the T assistant lines, for example, middle points of the T assistant lines may be determined as the center points, thereby T center points may be obtained.

For example, by determining a middle point of the assistant line 1103, the center point 1 in FIG. 11 may be obtained, and the same operation is performed for each assistant line, so that T center points may be obtained.

The candidate line may be obtained by connecting the T center points in sequence. For example, 1104 in FIG. 11 represents the connecting line of the center points, which is the candidate line. It may be understood that the candidate line determined here may actually be a center line, on which the center points are too dense, so that thinning processing is required.

S1004: for each gauge point in the primary edge line, determine a first proportion of a first distance between the gauge point and the end point of the primary edge line in the length of the primary edge line according to the first distance and the length of the primary edge line.

When performing thinning processing in this embodiment, thinning is performed based on each gauge point on the primary edge line. Specifically, thinning is performed based on the position of each gauge point in the primary edge line. Therefore, the position of each gauge point in the primary edge line needs to be determined, and the implementation of each gauge point is similar, and any one of the gauge points is taken as an example for introduction.

A position proportion of the gauge point in the primary edge line is currently necessary to be determined, which, for example, is located at 10% position or 20% position, then the first proportion of the first distance between the gauge point and the end point of the primary edge line in the length of the primary edge line may be determined based on the first distance and the length of the primary edge line, where the primary edge line may have two end points, and the current distance to the end point can be determined according to any of the end points.

For example, it can be understood with reference to FIG. 12. As illustrated in FIG. 12, it is assumed that there are currently 6 gauge points on the primary edge line, the length of the primary edge line may be expressed as, for example, length( ), and the distance between every two neighboring gauge points is also illustrated in the figure, the length( ) therein is actually α+β+γ+δ+ε.

Taking a gauge point b as an example, a first distance between the gauge point b and an end point a of the primary edge line is a, and then, for example, the first distance a may be divided by the length of the primary edge line length( ) to obtain the first proportion of the first distance in the length of the primary edge line, for example, which may be expressed as offset0.

S1005: determine a mapping point corresponding to each gauge point in the primary edge line in the candidate lines according to the length of the candidate lines and the first proportion, where a second proportion of a second distance between the mapping point and the end point of the candidate line in the length of the candidate line is equal to the first proportion.

After determining the first proportion of the first distance in the length of the primary edge line, the center point may be determined at the corresponding position in the candidate line. The embodiment aims to thin out the center points, specifically, the embodiment requires to be select a portion of the center points from the candidate line. In a possible implementation, the mapping point corresponding to each gauge point may be selected to obtain the center points after thinning.

When determining the mapping point corresponding to each gauge point, a mapping point corresponding to each gauge point may be determined in the candidate lines according to the first proportion corresponding to each gauge point and the length of the candidate line, where a second proportion of a second distance between the mapping point and the end point of the candidate line in the length of the candidate line is equal to the first proportion.

For example, if a first proportion corresponding to a certain gauge point is 10%, a center point of the position corresponding to 10% of the length of candidate line may be determined as the mapping point corresponding to the current gauge point.

It may also be understood with reference to FIG. 12. As illustrated in 12, it is assumed that the first proportion corresponding to the currently determined gauge point a is 10%, the center point corresponding to the 10% position of the length of the candidate line may be determined according to the length length1 (ζ+η+θ++ι+κ) of the candidate line, which may, for example, be the center point d shown in FIG. 12, so that the mapping point corresponding to the gauge point a, that is, point d, is obtained.

Similar processing is performed on each gauge point, so that the mapping point corresponding to each gauge point may be obtained.

Based on the above introduction, it may be determined that the original gauge points may or may not be kept during the process of interpolation processing. It may be understood that because the thinning processing method provided in this embodiment determines the center point according to the proportion, the center point may be determined regardless of whether the original gauge point is kept in the point set.

At the same time, it should be noted that the position proportion of the gauge point in the primary edge line is currently used, where the position of the gauge point may be determined. In this case, there is no need to ensure that the gauge point is kept in the point set. Therefore, the thinning processing method provided by this embodiment may be applied to any situation after interpolation processing.

S1006: determine the center line of the road in the map according to the mapping points of the candidate line.

Each mapping point in the candidate line is actually the center point after thinning processing, and therefore the center line of the road is determined by connecting the mapping points in the candidate line.

The map processing method provided by the embodiment of the present disclosure determines the center point corresponding to each gauge point in the corresponding proportion position in the candidate line according to the position proportion of each gauge point of the primary edge line in the primary edge line. Thereby, the center point corresponding to each gauge point may be thinned according to the corresponding proportion. The current thinning processing method is applicable to both the interpolation method that keeps the gauge points and the interpolation method that does not keep the gauge points, so that the accuracy and stability of the thinning process may be effectively guaranteed. In addition, each center point after thinning determined according to the above-mentioned manner conforms to the shape of the original gauge points as much as possible, so that the accuracy of the determined center line may be effectively improved.

The above introduction is the implementation of thinning processing based on the position proportion, an implementation of another thinning processing will be introduced below with reference to FIG. 13, which is a fourth flowchart of a map processing method provided by an embodiment of the disclosure.

Figure 13:
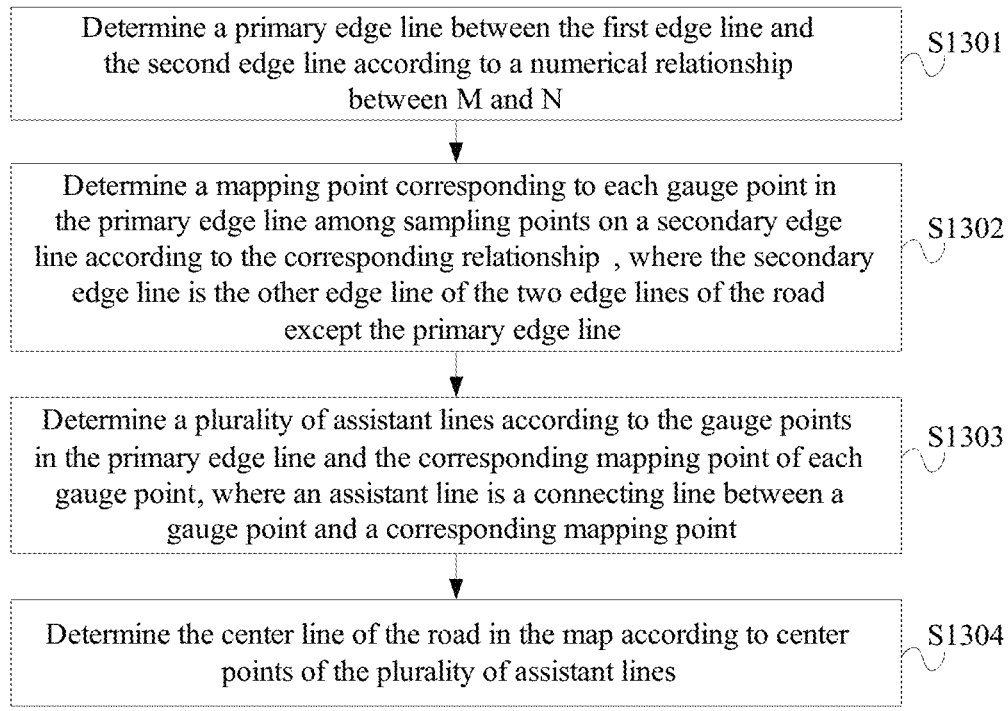
FIG. 13 is a fourth flowchart of a map processing method provided by an embodiment of the disclosure.

As illustrated in FIG. 13, the method includes:

S1301: determine a primary edge line between the first edge line and the second edge line according to a numerical relationship between M and N.

The implementation of S1301 is the same as the implementation of S1101, and will not be repeated here.

S1302, determine a mapping point corresponding to each gauge point in the primary edge line among sampling points on a secondary edge line according to the corresponding relationship, where the secondary edge line is the other edge line of the two edge lines of the road except the primary edge line.

The one-to-one corresponding relationship between the T first sampling points on the first edge line and the T second sampling points on the second edge line may be determined in this embodiment. Therefore, the mapping point corresponding to each gauge point in the primary edge line may be determined among the sampling points on the secondary edge line directly according to the corresponding relationship.

If the primary edge line is the first edge line, the secondary edge line is the second edge line; or, if the primary edge line is the second edge line, the secondary edge line is the first edge line.

The mapping point corresponding to each gauge point in the primary edge line is a sampling point in the secondary edge line corresponding to each gauge point in each primary edge line indicated in the correspondence relationship.

S1303: determine a plurality of assistant lines according to the gauge points in the primary edge line and the corresponding mapping point of each gauge point, where an assistant line is a connecting line between a gauge point and a corresponding mapping point.

The implementation of determining the assistant line is the same as the implementation of S1002, and will not be repeated here.

S1304: determine the center line of the road in the map according to center points of the plurality of assistant lines.

After determining the assistant line corresponding to each gauge point of the primary edge line, the center points of each assistant line are actually the corresponding center point of each gauge point of the primary edge line, and then the center points of the plurality of assistant lines are directly connected to determine the center line of the road.

The current implementation of thinning processing actually means that the corresponding center point of each gauge point in the primary edge line is directly determined as the center point after thinning process, so it may be understood that it is necessary to ensure that the interpolated point set includes the gauge points in this implementation, if the gauge points are not kept, the center points corresponding to the gauge points may not be determined.

The map processing method provided by the embodiment of the present disclosure directly determines the corresponding center point of each gauge point in the primary edge line as the center point after thinning processing, so that the thinning processing may be implemented on the center points quickly and efficiently, and then the center line is determined according to the center points after thinning processing, which may effectively improve the speed and efficiency of determining the center line.

Figure 14:
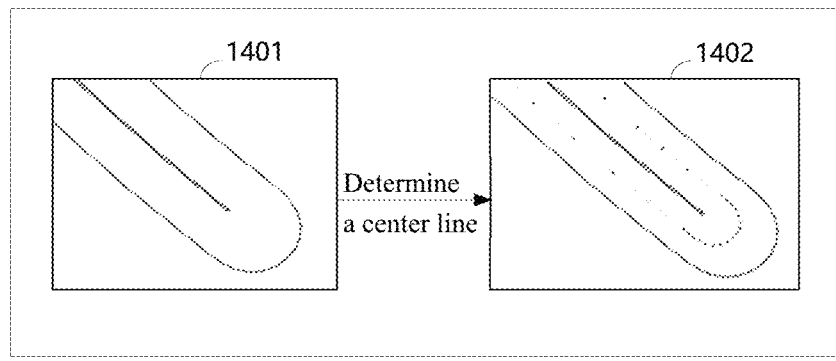
FIG. 14 is a first implementation diagram of determining a center line provided by an embodiment of the disclosure.
Figure 15:
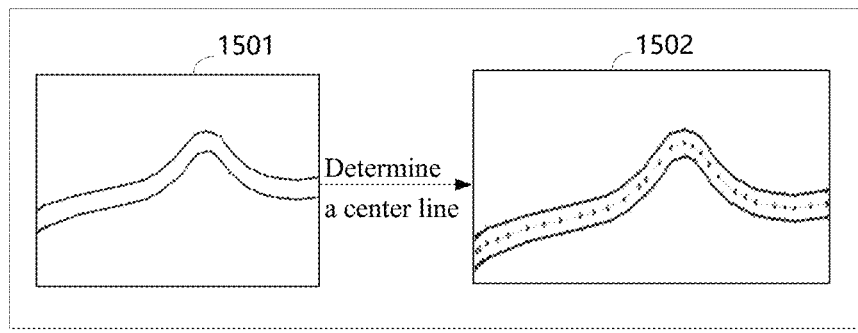
FIG. 15 is a second implementation diagram of determining a center line provided by an embodiment of the disclosure.
Figure 16:
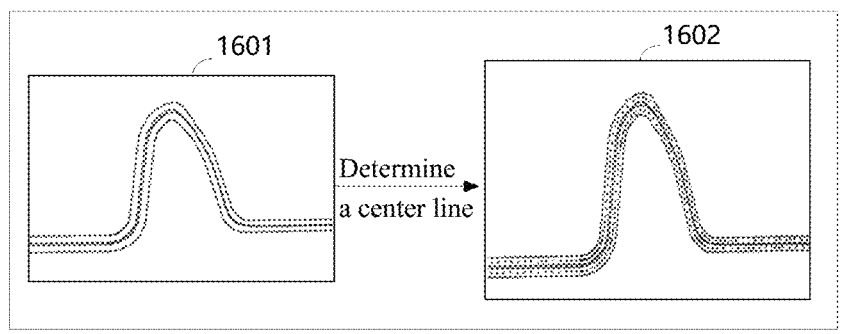
FIG. 16 is a third implementation diagram of determining a center line provided by an embodiment of the disclosure.
Figure 17:
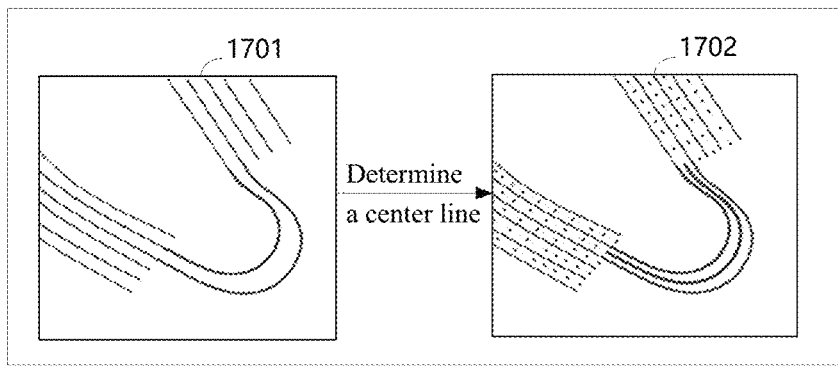
FIG. 17 is a fourth implementation diagram of determining a center line provided by an embodiment of the disclosure.
Figure 18:
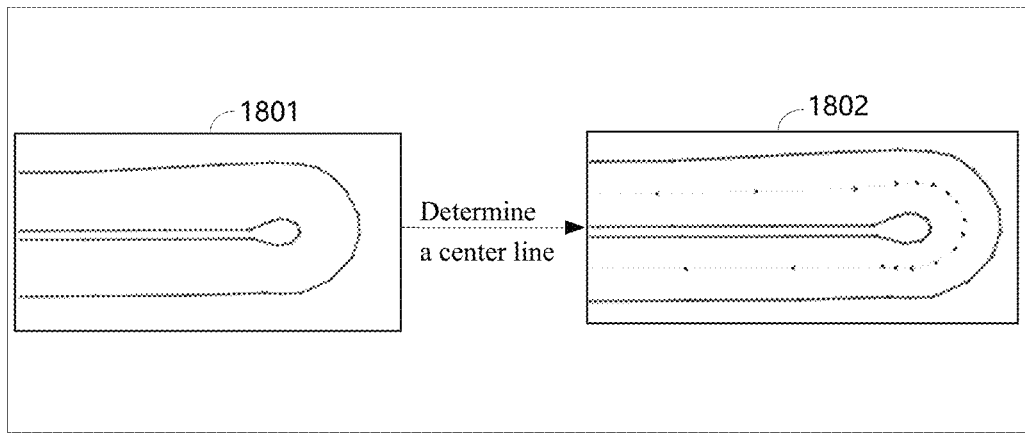
FIG. 18 is a fifth implementation diagram of determining a center line provided by an embodiment of the disclosure.

For example, the effect of the center line determined by the map processing method in the embodiments of the present disclosure may be understood with reference to FIGS. 14 to 18, FIG. 14 is a first implementation diagram of determining a center line provided by an embodiment of the disclosure, FIG. 15 is a second implementation diagram of determining a center line provided by an embodiment of the disclosure, FIG. 16 is a third implementation diagram of determining a center line provided by an embodiment of the disclosure, FIG. 17 is a fourth implementation diagram of determining a center line provided by an embodiment of the disclosure, FIG. 18 is a fifth implementation diagram of determining a center line provided by an embodiment of the disclosure.

As illustrated in FIG. 14, 1401 in FIG. 14 represents the sidelines on both sides, and 1402 represents the center point determined based on the sidelines on both sides and the center line constituted by the center points.

FIGS. 15 to 18 are similar, it may be determined with reference to FIGS. 14 to 18 that the accuracy of the center line determined based on the map processing method provided by the embodiments of the present disclosure may be effectively ensured.

In conclusion, in the map processing method provided by the embodiments of the present disclosure, in order to avoid the accuracy of the determined center line from being not high caused by a large difference in the number of gauge points on the sidelines on both sides. On the basis of keeping the original shape of the road, interpolation processing is performed on the edges on both sides to obtain uniform sampling points of the same number, so as to obtain an one-to-one corresponding relationship between the points on the edges on both sides, and then obtain a densely sampled ideal center line (that is, the candidate line described above).

After that, further, thinning processing may be performed on the center line according to the original shape points of the sideline to avoid large amount of processed data caused due to that the center points are too dense, then the center line is determined according to the center points after thinning processing, which may ensure that the obtained center line completely maintains the shape of the edge line, and has a high robustness.

Figure 19:
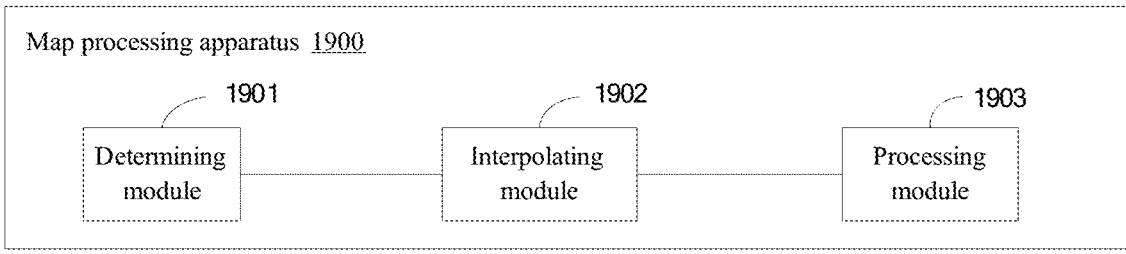
FIG. 19 is a structural diagram of a map processing apparatus according to an embodiment of the present disclosure.

FIG. 19 is a structural diagram of a map processing apparatus according to an embodiment of the present disclosure. As illustrated in FIG. 19, the map processing apparatus of this embodiment may include: a determining module 1901, an interpolating module 1902 and a processing module 1903.

The determining module 1901 is configured to determine a road to be processed in a map, where the road has a first edge line and a second edge line, there are M gauge points on the first edge line, there are N gauge points on the second edge line, and M and N are integers greater than or equal to 2 respectively.

The interpolating module 1902 is configured to perform interpolation processing on the M gauge points on the first edge line to obtain a first point set of T first sampling points on the first edge line and perform interpolation processing on the N gauge points on the second edge line to obtain a second point set of T second sampling points on the second edge line according to a first length of the first edge line, a second length of the second edge line and a preset point density, where T is an integer greater than or equal to 2.

The determining module 1901 is further configured to determine a corresponding relationship between the points in the first point set and the points in the second point set.

The processing module 1903 is configured to determine a center line of the road in the map according to M, N and the corresponding relationship.

In a possible implementation, the processing module 1903 is specifically configured to:
  determine a primary edge line between the first edge line and the second edge line according to a numerical relationship between M and N; and
  determine the center line of the road in the map according to gauge points in the primary edge line and the corresponding relationship.

In a possible implementation, the processing module 1903 is specifically configured to:
  determine a mapping point corresponding to each gauge point in the primary edge line among sampling points on a secondary edge line according to the corresponding relationship, where the secondary edge line is the other edge line of the two edge lines of the road except the primary edge line;
  determine a plurality of assistant lines according to the gauge points in the primary edge line and the corresponding mapping point of each gauge point, where an assistant line is a connecting line between a gauge point and a corresponding mapping point; and
  determine the center line of the road in the map according to center points of the plurality of assistant lines.

In a possible implementation, the processing module 1903 is specifically configured to:
  determine T assistant lines according to the corresponding relationship, where each assistant line is a connecting line between the first sampling point and the second sampling point that have a corresponding relationship;
  determine T central points according to the T assistant lines, and determine a connecting line of the T center points as a candidate line; and determine the center line of the road in the map according to a distance between each gauge point in the primary edge line and an end point of the primary edge line, a length of the primary edge line and a length of the candidate line.

In a possible implementation, the processing module 1903 is specifically configured to:

determine a mapping point corresponding to each gauge point in the primary edge line in the candidate line according to the distance between each gauge point in the primary edge line and the end point of the primary edge line, the length of the primary edge line and the length of the candidate line; and determine the center line of the road in the map according to the mapping points of the candidate line.

In a possible implementation, the processing module 1903 is specifically configured to:

for each gauge point in the primary edge line, determine a first proportion of a first distance between the gauge point and the end point of the primary edge line in the length of the primary edge line according to the first distance and the length of the primary edge line; and determine a mapping point corresponding to each gauge point in the primary edge line in the candidate lines according to the length of the candidate lines and the first proportion, where a second proportion of a second distance between the mapping point and the end point of the candidate line in the length of the candidate line is equal to the first proportion.

In a possible implementation, the processing module 1903 is specifically configured to:

if M is greater than N, determine the first edge line as the primary edge line; and if M is less than N, determine the second edge line as the primary edge line.

In a possible implementation, the interpolating module 1902 is specifically configured to:

determine a total number of points according to the first length, the second length and the preset point density;

perform interpolation processing on the M gauge points on the first edge line according to the total number of points to obtain the first point set of the T first sampling points on the first edge line; and perform interpolation processing on the N gauge points on the second edge line according to the total number of points to obtain the second point set of the T second sampling points on the second edge line.

In a possible implementation, the interpolating module 1902 is specifically configured to:

if the first length is greater than or equal to the second length, determine the number of interpolation points between every two neighboring gauge points in the first edge line according to the preset point density, and determine a sum of the number of interpolation points between every two neighboring gauge points in the first edge line and M as the total number of points; and if the first length is less than the second length, determine the number of interpolation points between every two neighboring gauge points in the second edge line according to the preset point density, and determine a sum of the number of interpolation points between every two neighboring gauge points in the second edge line and N as the total number of the points.

In a possible implementation, the interpolating module 1902 is specifically configured to:

determine a first point density according to the total number of points and the length of the first edge line; and perform interpolation processing on the M gauge points on the first edge line according to the first point density to obtain the first point set of the T first sampling points on the first edge line.

In a possible implementation, the interpolating module 1902 is specifically configured to:

determine a position of an interpolation point between every two neighboring gauge points in the first edge line according to the first point density to obtain positions of K interpolation points; and add the K interpolation points into the first edge line according to the positions of the K interpolation points, where the first point set includes the K interpolation points and the M gauge points, and a sum of K and M is equal to T.

In a possible implementation, the interpolating module 1902 is specifically configured to:

determine the first point set of the T first sampling points on the first edge line according to the first point density and a shape of the first edge line, where the first point set includes part of the gauge points on the first edge line.

In a possible implementation, the interpolating module 1902 is specifically configured to:

determine a second point density according to the total number of points and the length of the second edge line; and perform second interpolation processing on the N gauge points on the second edge line according to the point density to obtain the second point set of the T second sampling points on the second edge line.

In a possible implementation, the interpolating module 1902 is specifically configured to:

determine a position of an interpolation point between every two neighboring gauge points in the second edge line according to the second point density to obtain positions of L interpolation points; and add the L interpolation points into the second edge line according to the positions of the L interpolation points, where the second point set includes the L interpolation points and the N gauge points, and a sum of L and N is equal to T.

In a possible implementation, the interpolating module 1902 is specifically configured to:

determine the second point set of the T second sampling points on the second edge line according to the second point density and a shape the edge line, where the second point set includes part of the gauge points on the second edge line.

The present disclosure provides a map processing method and apparatus, which are applied to an automatic driving technology in the field of data processing, so as to achieve the purpose of improving the accuracy of determining the center line.

According to an embodiment of the present disclosure, the present disclosure also provides an electronic device and a readable storage medium.

According to an embodiment of the present disclosure, the present disclosure also provides a computer program product, the computer program product includes a computer program, and the computer program is stored in a readable storage medium. At least one processor of an electronic device may read the computer program from the readable storage medium, and the at least one processor executes the computer program to cause the electronic device to execute the solution provided by any of the above embodiments.

Figure 20:
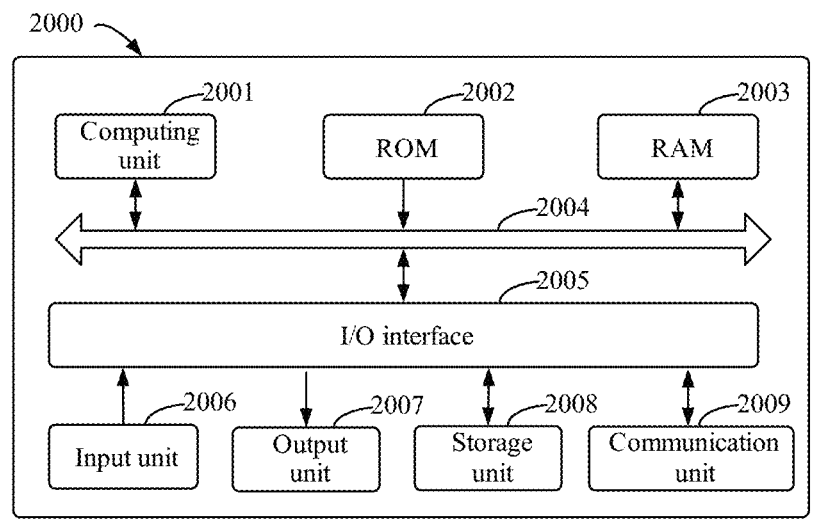
FIG. 20 is a block diagram of an electronic device for implementing a map processing method of an embodiment of the present disclosure.

FIG. 20 is a schematic block diagram of an example electronic device 2000 that can be configured to implement embodiments of the present disclosure. The electronic device refers to various forms of digital computers, such as laptop computers, desktop computers, workstations, personal digital assistants, servers, blade servers, mainframe computers, and other suitable computers. The electronic device may also represent various forms of mobile devices, such as personal digital assistants, cellular phones, smart phones, wearable devices, and other similar computing devices. The components shown herein, their connections and relationships, and their functions are merely illustrative of and not restrictive on the implementation of the present disclosure described and/or required herein.

As shown in FIG. 20, the electronic device 2000 includes a computing unit 2001, which can perform various appropriate actions and processing according to a computer program stored in a read only memory (ROM) 2002 or a computer program loaded from the storage unit 2008 into a random access memory (RAM) 2003. In the RAM 2003, various programs and data required for the operation of the device 2000 can also be stored. The computing unit 2001, the ROM 2002 and the RAM 2003 are connected to each other through a bus 2004. An input/output (I/O) interface 2005 is also connected to the bus 2004.

A plurality of components in the device 2000 are connected to the I/O interface 2005, including: an input unit 2006, such as a keyboard, a mouse, etc.; an output unit 2007, such as various types of displays, speakers, etc.; a storage unit 2008, such as a magnetic disk, an optical disk, etc.; and a communication unit 2009, such as a network card, a modem, a wireless communication transceiver, etc. The communication unit 2009 allows the device 2000 to exchange information/data with other devices through a computer network such as the Internet and/or various telecommunication networks.

The computing unit 2001 may be various general-purpose and/or special-purpose processing components with processing and computing capacities. Some examples of the computing unit 2001 include, but are not limited to, a central processing unit (CPU), a graphics processing unit (GPU), various dedicated artificial intelligence (AI) computing chips, various computing units that run machine learning model algorithms, a digital signal processor (DSP), and any suitable processor, controller, microcontroller, etc. The computing unit 2001 performs various methods and processes described above, such as the map processing method. For example, in some embodiments, the map processing method can be implemented as a computer software program, which is tangibly contained in a machine-readable medium, such as the storage unit 2008. In some embodiments, part or entire of the computer program may be loaded and/or installed on the device 2000 via the ROM 2002 and/or the communication unit 2009. When the computer program is loaded into the RAM 2003 and executed by the computing unit 2001, one or more steps of the map processing method described above can be executed. Alternatively, in other embodiments, the computing unit 2001 may be configured to execute the map processing method in any other suitable manner (for example, by means of firmware).

Various implementations of the systems and technologies described above herein may be implemented in digital electronic circuit systems, integrated circuit systems, field programmable gate arrays (FPGA), application specific integrated circuits (ASIC), application specific standard products (ASSP), system-on-chip (SOC), load programmable logic devices (CPLD), computer hardware, firmware, software, and/or combinations thereof. These various implementations may include: being implemented in one or more computer programs that can be executed and/or interpreted on a programmable system including at least one programmable processor, which can be a dedicated or general-purpose programmable processor and can receive data and instructions from and transmit data and instructions to a storage system, at least one input device, and at least one output device.

The program code for implementing the method according to the present disclosure can be written in any combination of one or more programming languages. These program codes may be provided to the processors or controllers of general-purpose computers, special-purpose computers, or other programmable data processing devices, such that the program codes, when executed by the processor or controller, cause the functions/operations specified in the flowcharts and/or block diagrams to be implemented. The program code may be executed entirely on the machine, partially on the machine, partially on the machine as an independent software package and partially on the remote machine, or entirely on the remote machine or server.

In the context of the present disclosure, a machine-readable medium may be a tangible medium that may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of the machine-readable storage medium may include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In order to provide interaction with the user, the system and technology described here can be implemented on a computer that has: a display device used to display information to users (e.g., a cathode ray tube (CRT) or liquid crystal display (LCD) monitor); and a keyboard and a pointing device (e.g., a mouse or a trackball), through which the user can provide input to the computer. Other types of devices can also be used to provide interaction with the user; for example, the feedback provided to the user can be any form of sensory feedback (e.g., visual feedback, auditory feedback, or tactile feedback); and any form (including sound input, voice input or tactile input) can be used to receive input from the user.

The system and technology described here can be implemented in a computing system that includes back-end components (e.g., as a data server), or a computing system that includes middleware components (e.g., an application server), or a computing system that includes front-end components (e.g., a user computer with a graphical user interface or a web browser, and the user can interact with the implementation of the system and technology described here through the graphical user interface or web browser), or a computing system that includes any combination of such back-end component, middleware component, or front-end component. The components of the system can be connected to each other through any form or medium of digital data communication (e.g., a communication network). Examples of communication networks include: local area network (LAN), wide area network (WAN), and the Internet.

The computer system can include clients and servers that are generally far away from each other and usually interact with each other through a communication network. The relationship between the client and the server is generated by computer programs running on corresponding computers and having a client-server relationship with each other. The server can be a cloud server, also known as a cloud computing server or a cloud host, which is a host product in the cloud computing service system, to solve the defects of difficult management and weak business scalability in traditional physical host and VPS service ("Virtual Private Server", or VPS for short). The server can also be a server of a distributed system or a server combined with a blockchain.

Understanding that the various forms of processes shown above can be used to reorder, add or delete steps. For example, the steps described in the present disclosure can be performed in parallel, sequentially, or in a different order, as long as the desired result of the technical solution disclosed in the present disclosure can be achieved, which is not limited herein.

The above specific implementations do not constitute a limitation on the scope of protection of the present disclosure. Those skilled in the art should understand that various modifications, combinations, sub-combinations, and substitutions can be made according to design requirements and other factors. Any amendments, equivalent substitutions and improvements made within the spirit and principles of the present disclosure shall be included in the scope of protection of the present disclosure.

What is claimed is:

1. A data processing method, comprising:
    determining, by a processor, a road to be processed in a map, wherein the road has a first edge line and a second edge line, there are M gauge points on the first edge line, there are N gauge points on the second edge line, and M and N are integers greater than or equal to 2 respectively;
    performing, by the processor, interpolation processing on the M gauge points on the first edge line to obtain a first point set of T first sampling points on the first edge line and performing, by the processor, interpolation processing on the N gauge points on the second edge line to obtain a second point set of T second sampling points on the second edge line according to a first length of the first edge line, a second length of the second edge line and a preset point density, wherein T is an integer greater than or equal to 2;
    determining, by the processor, a corresponding relationship between the points in the first point set and the points in the second point set;
    determining, by the processor, a center line of the road in the map according to M, N and the corresponding relationship, and
    keeping a travel track of a vehicle in a center of the road according to the center line of the road.

2. The method according to claim 1, wherein the determining, by the processor, a center line of the road in the map according to M, N and the corresponding relationship comprises:
    determining a primary edge line between the first edge line and the second edge line according to a numerical relationship between M and N; and
    determining the center line of the road in the map according to gauge points in the primary edge line and the corresponding relationship.

3. The method according to claim 2, wherein the determining the center line of the road in the map according to gauge points in the primary edge line and the corresponding relationship comprises:
    determining a mapping point corresponding to each gauge point in the primary edge line among sampling points on a secondary edge line according to the corresponding relationship, wherein the secondary edge line is the other edge line of the two edge lines of the road except the primary edge line;
    determining a plurality of assistant lines according to the gauge points in the primary edge line and the corresponding mapping point of each gauge point, wherein an assistant line is a connecting line between a gauge point and a corresponding mapping point; and
    determining the center line of the road in the map according to center points of the plurality of assistant lines.

4. The method according to claim 3, wherein the determining a primary edge line between the first edge line and the second edge line according to a numerical relationship between M and N comprises:
    if M is greater than N, determining the first edge line as the primary edge line; and
    if M is less than N, determining the second edge line as the primary edge line.

5. The method according to claim 2, wherein the determining the center line of the road in the map according to the gauge points in the primary edge line and the corresponding relationship comprises:
    determining T assistant lines according to the corresponding relationship, wherein each assistant line is a connecting line between the first sampling point and the second sampling point that have a corresponding relationship;
    determining T central points according to the T assistant lines, and determining a connecting line of the T center points as a candidate line; and
    determining the center line of the road in the map according to a distance between each gauge point in the primary edge line and an end point of the primary edge line, a length of the primary edge line and a length of the candidate line.

6. The method according to claim 5, wherein the determining the center line of the road in the map according to a distance between each gauge point in the primary edge line and an end point of the primary edge line, a length of the primary edge line and a length of the candidate line comprises:
    determining a mapping point corresponding to each gauge point in the primary edge line in the candidate line according to the distance between each gauge point in the primary edge line and the end point of the primary edge line, the length of the primary edge line and the length of the candidate line; and
    determining the center line of the road in the map according to the mapping points of the candidate line.

7. The method according to claim 6, wherein the determining a mapping point corresponding to each gauge point in the primary edge line in the candidate line according to the distance between each gauge point in the primary edge line and the end point of the primary edge line, the length of the primary edge line and the length of the candidate line comprises:

for each gauge point in the primary edge line, determining a first proportion of a first distance between the gauge point and the end point of the primary edge line in the length of the primary edge line according to the first distance and the length of the primary edge line; and determining a mapping point corresponding to each gauge point in the primary edge line in the candidate lines according to the length of the candidate lines and the first proportion, wherein a second proportion of a second distance between the mapping point and the end point of the candidate line in the length of the candidate line is equal to the first proportion.

8. The method according to claim 2, wherein the determining a primary edge line between the first edge line and the second edge line according to a numerical relationship between M and N comprises:

if M is greater than N, determining the first edge line as the primary edge line; and if M is less than N, determining the second edge line as the primary edge line.

9. The method according to claim 1, wherein the performing, by the processor, interpolation processing on the M gauge points on the first edge line to obtain a first point set of T first sampling points on the first edge line and performing, by the processor, interpolation processing on the N gauge points on the second edge line to obtain a second point set of T second sampling points on the second edge line according to a first length of the first edge line, a second length of the second edge line and a preset point density comprises:

determining a total number of points according to the first length, the second length and the preset point density;

performing interpolation processing on the M gauge points on the first edge line according to the total number of points to obtain the first point set of the T first sampling points on the first edge line; and performing interpolation processing on the N gauge points on the second edge line according to the total number of points to obtain the second point set of the T second sampling points on the second edge line.

10. The method according to claim 9, wherein the determining a total number of points according to the first length, the second length and the preset point density comprises:

if the first length is greater than or equal to the second length, determining the number of interpolation points between every two neighboring gauge points in the first edge line according to the preset point density, and determining a sum of the number of interpolation points between every two neighboring gauge points in the first edge line and M as the total number of points; and if the first length is less than the second length, determining the number of interpolation points between every two neighboring gauge points in the second edge line according to the preset point density, and determining a sum of the number of interpolation points between every two neighboring gauge points in the second edge line and N as the total number of the points.

11. The method according to claim 10, wherein the performing interpolation processing on the M gauge points on the first edge line according to the total number of points to obtain the first point set of the T first sampling points on the first edge line comprises:

determining a first point density according to the total number of points and the length of the first edge line; and performing interpolation processing on the M gauge points on the first edge line according to the first point density to obtain the first point set of the T first sampling points on the first edge line.

12. The method according to claim 10, wherein the performing interpolation processing on the N gauge points on the second edge line according to the total number of points to obtain the second point set of the T second sampling points on the second edge line comprises:

determining a second point density according to the total number of points and the length of the second edge line; and performing second interpolation processing on the N gauge points on the second edge line according to the point density to obtain the second point set of the T second sampling points on the second edge line.

13. The method according to claim 9, wherein the performing interpolation processing on the M gauge points on the first edge line according to the total number of points to obtain the first point set of the T first sampling points on the first edge line comprises:

determining a first point density according to the total number of points and the length of the first edge line; and performing interpolation processing on the M gauge points on the first edge line according to the first point density to obtain the first point set of the T first sampling points on the first edge line.

14. The method according to claim 13, wherein the performing interpolation processing on the M gauge points on the first edge line according to the first point density to obtain the first point set of the T first sampling points on the first edge line comprises:

determining a position of an interpolation point between every two neighboring gauge points in the first edge line according to the first point density to obtain positions of K interpolation points; and adding the K interpolation points into the first edge line according to the positions of the K interpolation points, wherein the first point set comprises the K interpolation points and the M gauge points, and a sum of K and M is equal to T.

15. The method according to claim 13, wherein the performing interpolation processing on the M gauge points on the first edge line according to the first point density to obtain the first point set of the T first sampling points on the first edge line comprises:

determining the T first sampling points on the first edge line according to the first point density and a shape of the first edge line, wherein the first point set comprises part of the gauge points on the first edge line.

16. The method according to claim 9, wherein the performing interpolation processing on the N gauge points on the second edge line according to the total number of points to obtain the second point set of the T second sampling points on the second edge line comprises:

determining a second point density according to the total number of points and the length of the second edge line; and performing second interpolation processing on the N gauge points on the second edge line according to the point density to obtain the second point set of the T second sampling points on the second edge line.

17. The method according to claim 16, wherein the performing second interpolation processing on the N gauge points on the second edge line according to the point density to obtain the second point set of the T second sampling points on the second edge line comprises:
   determining a position of an interpolation point between every two neighboring gauge points in the second edge line according to the second point density to obtain positions of L interpolation points; and
   adding the L interpolation points into the second edge line according to the positions of the L interpolation points, wherein the second point set comprises the L interpolation points and the N gauge points, and a sum of L and N is equal to T.

18. The method according to claim 16, wherein the performing second interpolation processing on the N gauge points on the second edge line according to the point density to obtain the second point set of the T second sampling points on the second edge line comprises:
   determining the second point set of the T second sampling points on the second edge line according to the second point density and a shape the edge line, wherein the second point set comprises part of the gauge points on the second edge line.

19. A map processing apparatus, comprising:
   a memory, configured to store a computer program; and
   a processor, configured to call and run the computer program stored in the memory to:
   determine a road to be processed in a map, wherein the road has a first edge line and a second edge line, there are M gauge points on the first edge line, there are N gauge points on the second edge line, and M and N are integers greater than or equal to 2 respectively;
   perform interpolation processing on the M gauge points on the first edge line to obtain a first point set of T first sampling points on the first edge line and perform interpolation processing on the N gauge points on the second edge line to obtain a second point set of T second sampling points on the second edge line according to a first length of the first edge line, a second length of the second edge line and a preset point density, wherein T is an integer greater than or equal to 2;
   determine a corresponding relationship between the points in the first point set and the points in the second point set;
   determine a center line of the road in the map according to M, N and the corresponding relationship, and
   keep a travel track of a vehicle in a center of the road according to the center line of the road.

20. A non-transitory computer readable storage medium storing computer instructions, wherein the computer instructions are used to cause a computer to:
   determine a road to be processed in a map, wherein the road has a first edge line and a second edge line, there are M gauge points on the first edge line, there are N gauge points on the second edge line, and M and N are integers greater than or equal to 2 respectively;
   perform interpolation processing on the M gauge points on the first edge line to obtain a first point set of T first sampling points on the first edge line and performing interpolation processing on the N gauge points on the second edge line to obtain a second point set of T second sampling points on the second edge line according to a first length of the first edge line, a second length of the second edge line and a preset point density, wherein T is an integer greater than or equal to 2;
   determine a corresponding relationship between the points in the first point set and the points in the second point set;
   determine a center line of the road in the map according to M, N and the corresponding relationship, and
   keep a travel track of a vehicle in a center of the road according to the center line of the road.

* * * * *